(12) United States Patent
Richard et al.

(10) Patent No.: US 7,184,620 B1
(45) Date of Patent: Feb. 27, 2007

(54) 3-PORT OPTICAL ADD-DROP MULTIPLEXER (OADM)

(75) Inventors: Jenkin A. Richard, Palo Alto, CA (US); Eric V. Chamness, Menlo Park, CA (US); Huapeng Guan, Fremont, CA (US)

(73) Assignee: Oplink Communications, Inc., Fremont, CA (US)

( * ) Notice: Subject to any disclaimer, the term of this patent is extended or adjusted under 35 U.S.C. 154(b) by 436 days.

(21) Appl. No.: 10/306,332

(22) Filed: Nov. 27, 2002

(51) Int. Cl.
*G02B 6/28* (2006.01)
(52) U.S. Cl. .......................................... 385/24; 385/31
(58) Field of Classification Search ................. 385/24, 385/31, 33; 398/79, 83, 85, 88
See application file for complete search history.

(56) References Cited

U.S. PATENT DOCUMENTS

| | | | |
|---|---|---|---|
| 5,712,717 A | 1/1998 | Hamel | |
| 5,778,118 A | 7/1998 | Sridhar | |
| 5,796,889 A * | 8/1998 | Xu et al. ....................... | 385/24 |
| 5,812,291 A | 9/1998 | Bendelli | |
| 5,822,095 A | 10/1998 | Taga | |
| 5,926,300 A | 7/1999 | Miyakawa | |
| 5,960,133 A | 9/1999 | Tomlinson | |
| 6,411,639 B1 * | 6/2002 | Namiwaka ..................... | 372/92 |
| 6,535,668 B2 * | 3/2003 | Liu et al. ....................... | 385/33 |
| 6,553,160 B2 * | 4/2003 | Cao .............................. | 385/24 |
| 6,834,137 B2 * | 12/2004 | Pan et al. ..................... | 385/18 |
| 6,860,644 B2 * | 3/2005 | Gage et al. ................... | 385/74 |

OTHER PUBLICATIONS

Oplink Communications, Inc., "100 GHZ Optical Add/Drop Multiplexer (1χ2)", OADM 101 A/D Series, Aug. 15, 2002, pp. 23-24.
Browave Corporation, "3-Port Add/Drop Filter", Aug. 15, 2002, p. 24.
Koncent, "Three-port CWDM", Aug. 15, 2002, pp. 41-42.
Optical Coating Laboratory, Inc. (OCLI), "OCLI Filters for Coarse WDM Applications", Aug. 23, 2000.

* cited by examiner

*Primary Examiner*—Michael G. Lee
*Assistant Examiner*—Jamara A. Franklin
(74) *Attorney, Agent, or Firm*—Fish & Richardson P.C.

(57) ABSTRACT

A low cost compact 3-port single-channel OADM with improved optical isolation is provided in which the I/O fibers and add/drop fiber are arranged on the same side. The 3-port OADM includes a 3-fiber pigtail and an angled reflector that together eliminate the second fiber collimator—one set of lenses and ferrules. The reflector is positioned behind and at angle to the free-space filter such that the add/drop optical signals are reflected back through the collimating lens to the appropriate fiber. In a drop filter, a signal is dropped from the optical signal on the input fiber and reflected back to the add/drop fiber. In an add filter, a signal is inserted from the add/drop fiber and reflected back to the output fiber. A 4-port OADM can be made by fiber-splicing a pair of 3-port OADMs.

29 Claims, 9 Drawing Sheets

3-PORT OPTICAL ADD-DROP MULTIPLEXER (OADM)

BACKGROUND OF THE INVENTION

1. Field of the Invention

This invention relates to optical add-drop multiplexers (OADMs) used in optical communication systems and more specifically to a compact and inexpensive 3-port single-channel OADM with improved optical isolation.

2. Description of the Related Art

Optical communication systems are a substantial and fast-growing constituent of communication networks. Such optical systems include, but are not limited to, telecommunications systems, cable televisions systems, and local area networks (LANs). Wavelength division multiplexing (WDM) is one approach for increasing capacity.

A WDM system employs multiple optical signal channels, each channel being assigned a particular channel wavelength. In a WDM system, optical signal channels are generated at the different channel wavelengths, multiplexed to form a multiplexed optical signal, transmitted over a single fiber or waveguide and demultiplexed such that each channel wavelength is individually routed to a designated receiver.

In many such applications, there is a need to route one or more of the multiplexed channels to different destinations. Such routing occurs when optical channels are sent to or withdrawn from an optical transmission link, e.g. for sending optical channels between a terminal and an optical bus or routing long distance telecommunications traffic to individual cities. This form of optical routing is generally referred to as "add-drop multiplexing."

To enable a given channel wavelength to be branched off a transmission link using WDM or a given channel wavelength to be added to the link, an element called an optical add/drop multiplexer (OADM) has been developed. The task of the OADM is (1) to direct off a selected narrow-band channel wavelength from the multiplexed optical signal that passes in an input fiber (drop function) and/or 2) to add to an output fiber a narrow-band channel wavelength (add function). The signals (channel wavelengths) that have not been selected pass through the OADM from the input to the output fiber.

Figure 1:
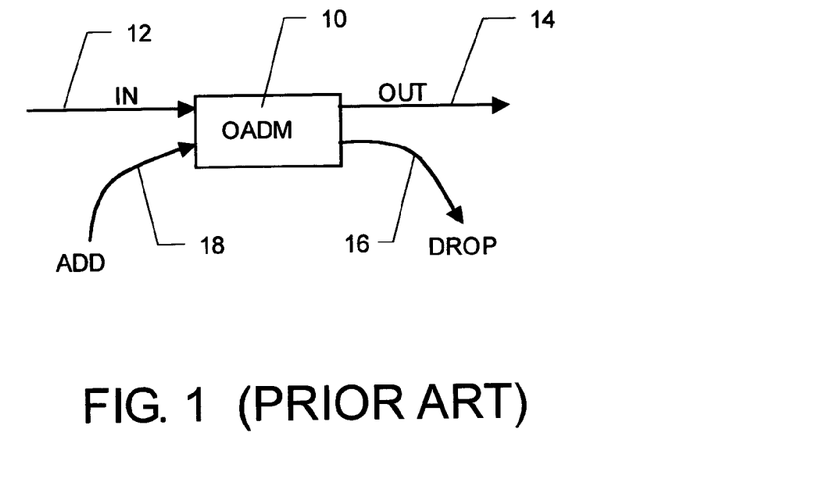
FIG. 1, as described above, is a block diagram of a generic OADM.

As shown in FIG. 1, an OADM 10 receives a multiplexed optical signal from an input fiber 12 and transmits the multiplexed optical signal to an output fiber 14. Typically, most of the signals pass through the OADM 10 with no change. In the case of a 4-port add AND drop multiplexer, the OADM 10 has the capability to remove one or more of the multiplexed signals from the input fiber 12 and put them on a drop fiber 16 and place replacement signals from an add fiber 18 onto the output fiber 14. In the case of a 3-port add OR drop multiplexer, the OADM 10 can either remove a signal via drop fiber 16 or replace a signal via add fiber 18. The device includes either the drop fiber 16 or add fiber 18 but not both. Multi-channel OADMs can be made by combining singe-channel add AND drop multiplexers or single-channel add OR drop multiplexers.

One known 4-port single-channel OADM uses two three-port optical circulators with a narrowband fiber grating (U.S. Pat. No. 5,822,095) or a thin film filter (U.S. Pat. No. 5,926,300) positioned between the two optical circulators. These devices are very expensive and bulky on account of the two three-port circulators and suffer from poor optical isolation. Another 4-port single-channel OADM arranges two identical thin-film filters in parallel planes to reflect the input beam twice to solve the optical isolation problem (U.S. Pat. No. 5,812,291). U.S. Pat. No. 5,712,717 proposes another way to improve optical isolation by combining a thin-film filter with a Bragg grating filter through fibers. However, the typical and most practical 4-port single-channel OADMs are configured by fiber splicing two 3-port single-channel OADMS together (see FIGS. 2 and 3 below).

Figure 2:
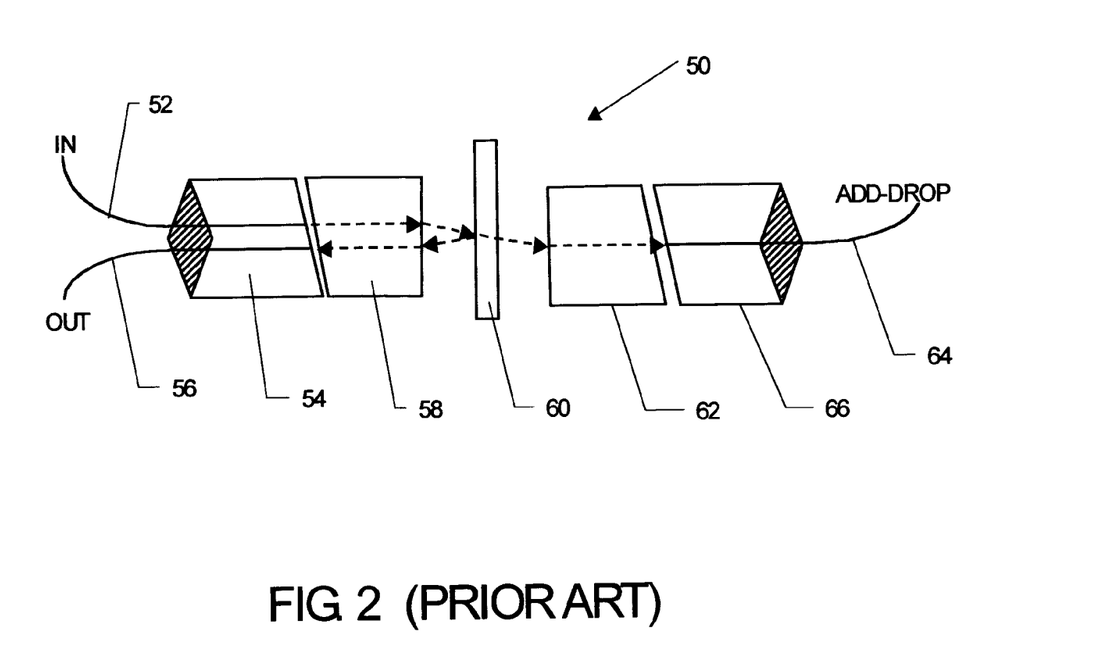
FIG. 2, as described above, is a block diagram of a known 3-port add OR drop mux.

As shown in FIG. 2, in a typical 3-port single-channel add OR drop OADM 50 the multiplexed optical signal enters OADM 50 through an input fiber 52, which is mounted in a dual-fiber glass ferrule 54 along with output fiber 56. The optical signal exits fiber 52 at the edge of ferrule 54, is collimated by lens 58, suitably a C or GRIN lens, and free-space coupled to a thin-film filter 60. The filter is designed to transmit a particular channel wavelength and reflect the remaining channel wavelengths. The filter specifications depend on whether the OADM is being used in dense, coarse, or general WDM applications. In a drop configuration, the transmitted and collimated optical channel wavelength enters a second lens 62, which focuses the signal into a drop fiber 64 in a single-fiber glass ferrule 66. The remaining channel wavelengths are reflected back through lens 58, which focuses the optical signal onto output fiber 56. In the add configuration, a channel wavelength enters through add fiber (also 64), is collimated by lens 62, passes through filter 60 and enters lens 58, which focuses the signal into output fiber 56 with the multiplexed optical signal.

This implementation is used by Oplink Communications (OADM 101A/D Series), Browave (3-Port Add/Drop Filter) and Koncent (Three-Port CWDM). The current 3-port optical add OR drop multiplexer uses two fiber collimators—two sets of lenses, ferrules and fibers, thus has high cost and large packaging size, approximately 5.5 mm in diameter and 32 mm in length. The input/output fibers and add/drop fiber are arranged on opposite sides of the device, which is inconvenient in certain applications.

Figure 3:
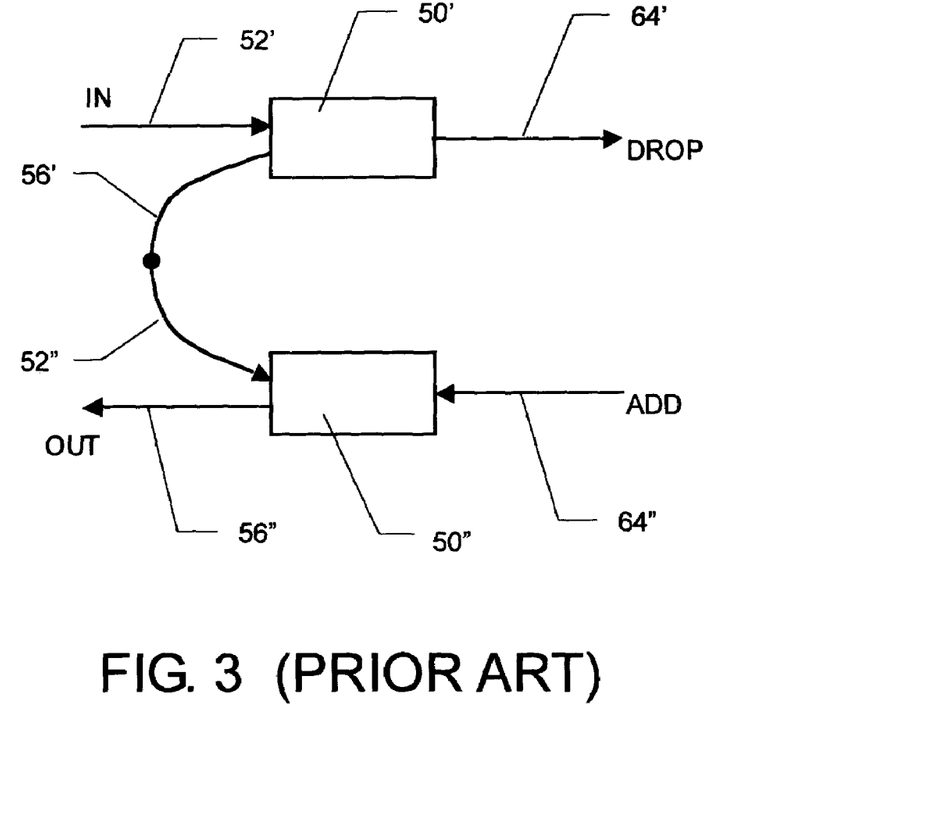
FIG. 3, as describe above, is a block diagram of a known 4-port add AND drop mux.

As shown in FIG. 3, a 4-port OADM is configured by fiber splicing the output fiber 56' of the 3-port drop OADM 50' to the input fiber 52" of a 3-port add OADM 50". Add OADM 50" is identical to drop OADM 50' except that input and output fibers shown in FIG. 2 have been reversed to facilitate the add function. In operation, a multiplexed optical signal carrier on input fiber 52' enter OADM 50' and the desired channel is dropped on-drop fiber 64'. The remaining optical channels are reflected back to output fiber 56', which is fiber spliced to input fiber 52. The multiplexed optical signal, absent the drop channel, enters OADM 50". An add channel at the same channel wavelength as the drop channel is inserted through add fiber 64" into the multiplexed optical signal, which is then transmitted on output fiber 56". Although adequate, this 4-port OADM uses four fiber collimators—four sets of lenses, ferrules and fibers, thus has high cost and large packaging size.

SUMMARY OF THE INVENTION

The present invention provides a low cost, compact 3-port OADM with improved optical isolation in which the I/O fibers and add/drop fiber are arranged on the same side.

A 3-port OADM is provided with a 3-fiber pigtail and an angled reflector that together eliminate the second fiber collimator—one set of a lens and a ferrule. The 3-fiber pigtail includes the input, output and add/drop fibers, which are all on the same side of the multiplexer. A lens collimates optical signals coming out of the fibers and focuses optical signals going back into the fibers. A filter is positioned such that optical signals in the filter's reflection band are reflected back through the collimating lens from the input fiber to the output fiber and the add/drop optical signals in the filter's transmission band are transmitted through the filter. A reflector is positioned behind and at angle to the filter such that the add/drop optical signals are reflected back through the collimating lens to the appropriate fiber. In a drop filter, a signal is dropped from the optical signal on the input fiber and reflected back to the add/drop fiber. In an add filter, a signal is inserted from the add/drop fiber and reflected back to the output fiber. A 4-port OADM is created by splicing the output fibers from a pair of 3-port OADMs.

In one embodiment, the 3-port OADM is provided with a 4-fiber pigtail that includes the input, output, and add/drop fibers and a fourth unused fiber inside a ferrule. This arrangement places the 4 fibers in contact with each other in a square configuration. Using standard alignment techniques, a collimating lens is aligned to the ferrule such that the 4 fibers are equally spaced from the central axis of the collimating lens. This ensures that all incident angles in the device with respect to the filter are the same angle. As a result, shifts in the center wavelengths and corresponding attenuations of signals are avoided. 3-fiber pigtails may be configured to provide similar performance but more complicated non-standard alignment techniques would be required.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 9 is a schematic diagram of a 4-port OADM configured with a pair of the 3-port OADMs shown in FIG. 5a.

DETAILED DESCRIPTION OF THE INVENTION

The present invention provides a low cost, compact 3-port OADM with improved optical isolation in which the I/O fibers and add/drop fiber are arranged on the same side. A 4-port OADM can be configured by splicing two 3-port OADMS.

Figure 4:
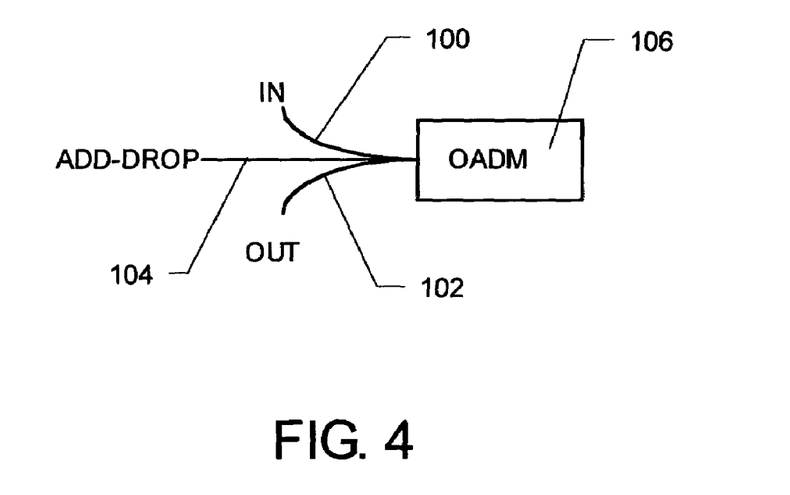
FIG. 4 is a diagram of a packaged three-port OADM in which the I/O and add/drop fibers are configured on one side of the device in accordance with the present invention.

The 3-port optical add OR drop multiplexer uses a single fiber collimator—one set of a lens, a ferrule and fibers, thus has a lower cost and more compact packaging size, approximately 5.5 mm in diameter and 17 mm in length, than the known OADM described in reference to FIG. 2. In addition, as shown in FIG. 4, the input/output fibers 100 and 102 and add/drop fiber 104 are arranged on the same side of the OADM package 106. This is particularly important given that the standard minimum bend radius for a fiber is one inch. Having three fibers on one side of the device eliminates the need for a fiber bend radius in many cases, substantially reducing the overall footprint of the device. The one drawback to this OADM configuration is that the add/drop signal must pass through the filter twice hence has a larger insertion loss. The tradeoff of slightly increased insertion loss versus a lower cost, more compact, better add/drop isolation and same side fiber connection is worthwhile in many applications.

Figure 5A:
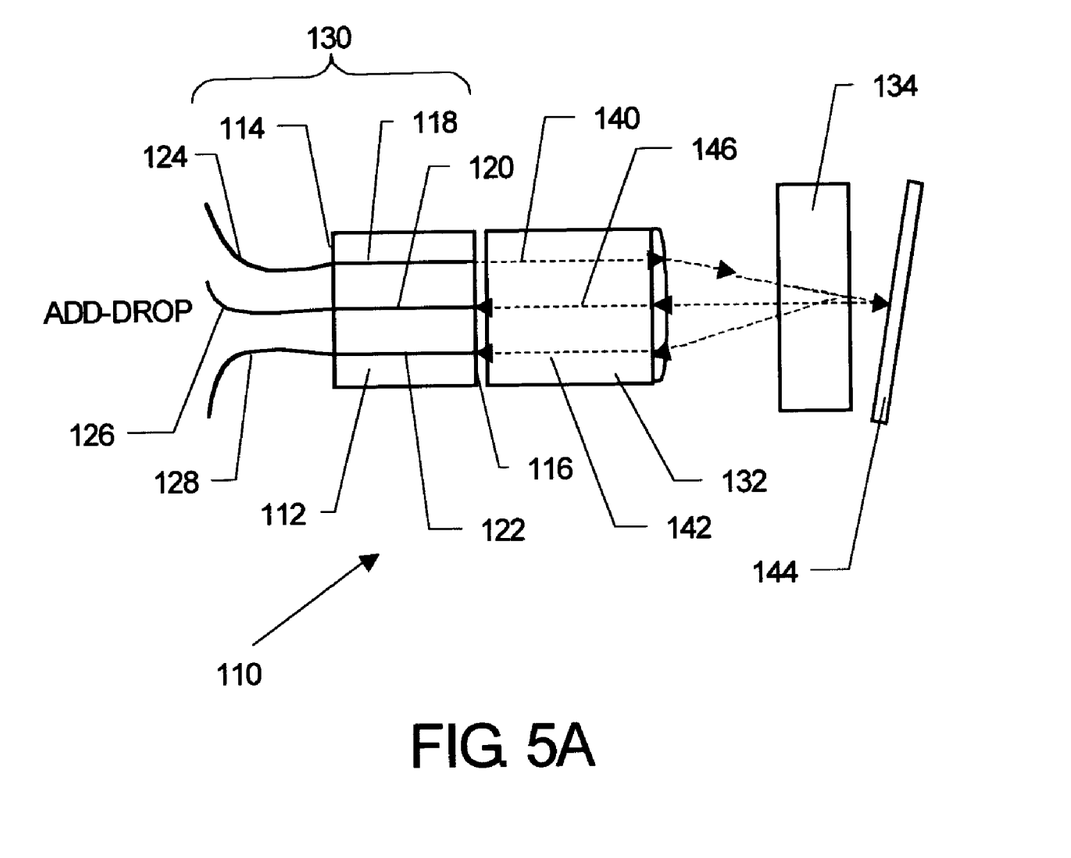
FIGS. 5a through 5c are schematic diagrams of different embodiments of a three-port OADM in accordance with the present invention.
Figure 5B:
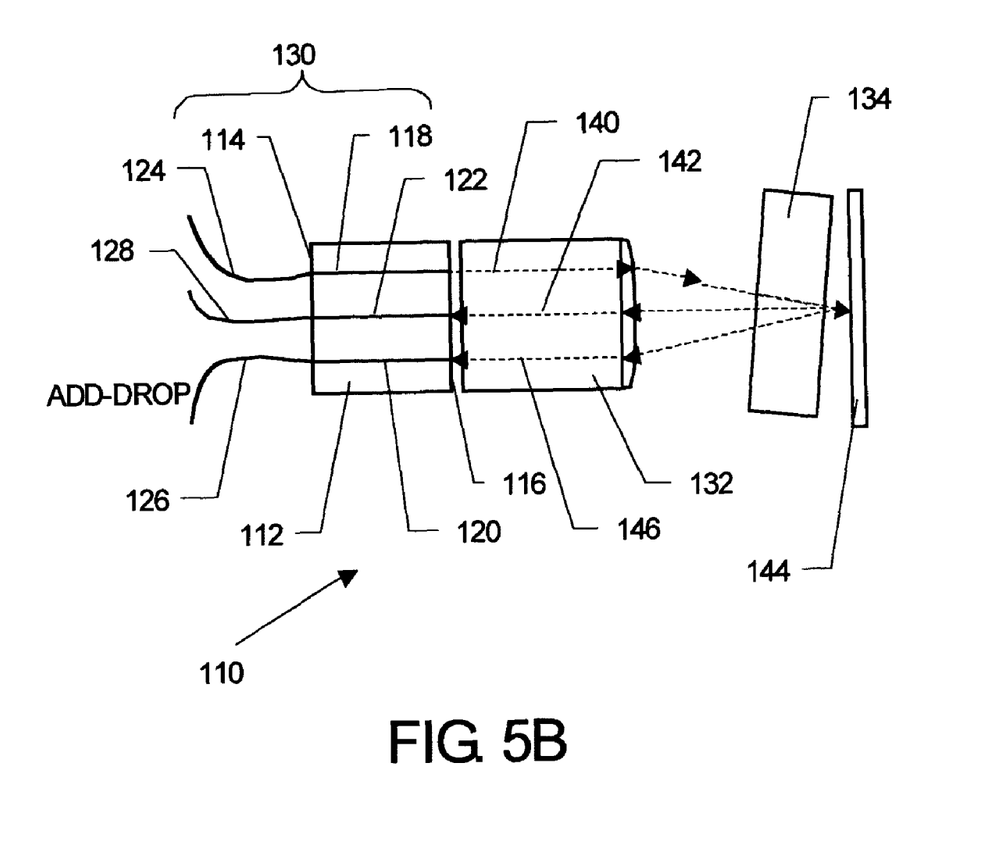
Figure 5C:
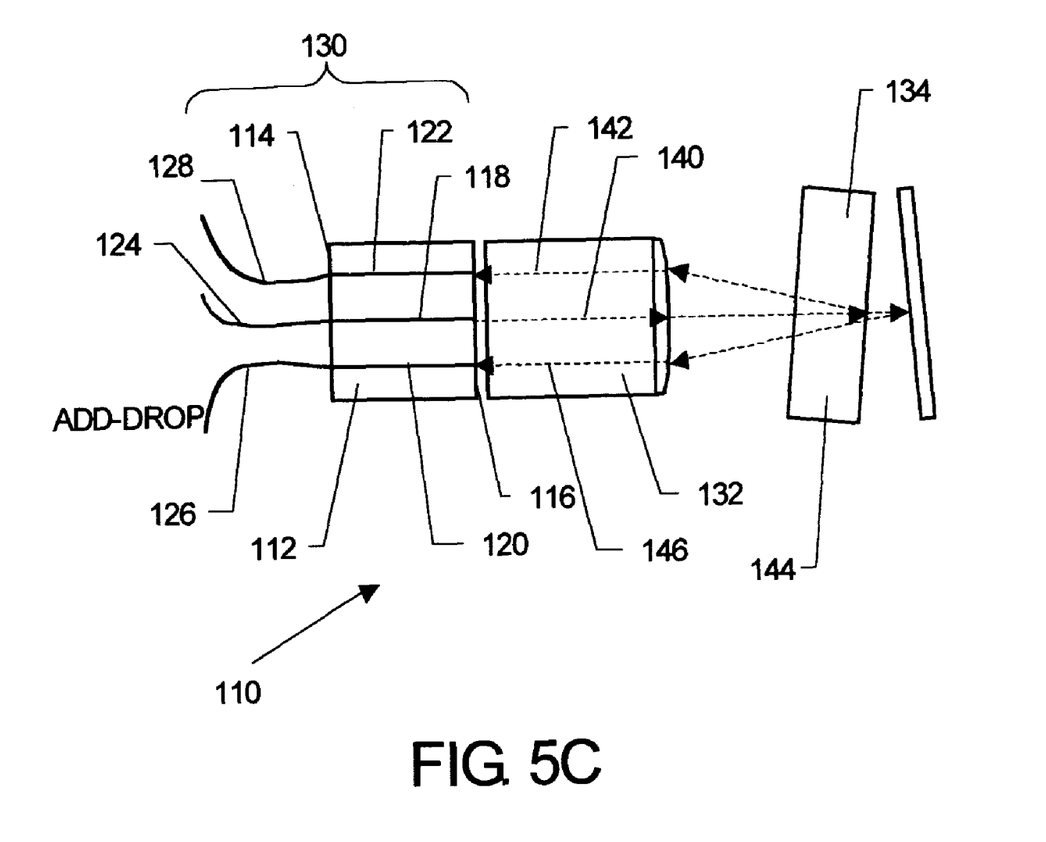
Figure 6A:
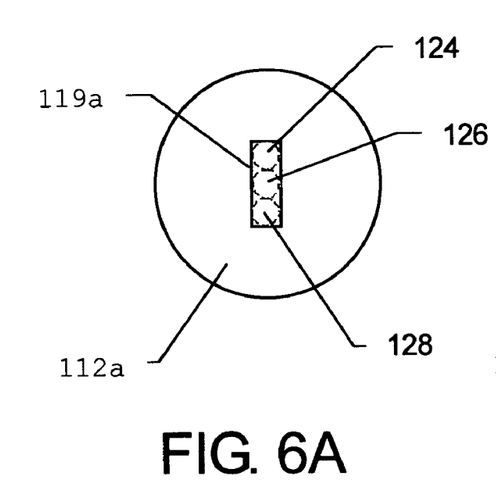
FIGS. 6a and 6b illustrate linear and triangular configurations of the three-fiber ferrule of FIG. 5a and FIG. 6c illustrates a square 4-fiber ferrule in which the fourth fiber is unused.
Figure 6B:
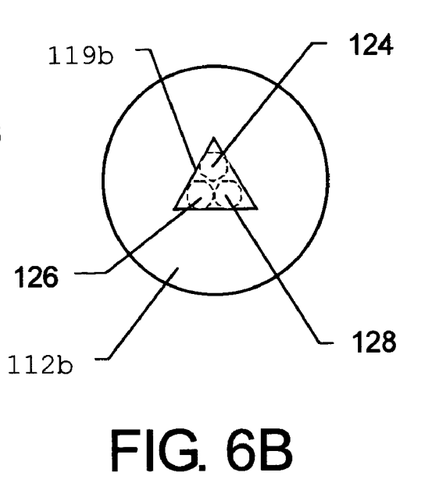
Figure 6C:
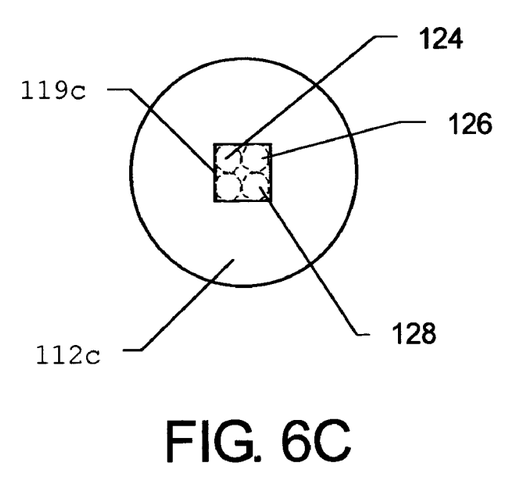

FIGS. 5a through 5c schematically illustrate three possible configurations of the 3-port drop OADM. The only differences between the three configurations are the angles of the filter 134 and reflector 144 and the physical positioning of the input, output and add/drop fibers in the ferrule. In FIGS. 5a through 5c, the fibers are arranged in the ferrule from top-to-bottom 1,2,3; 1,3,2; and 3,1,2, respectively, where fibers 1 and 3 are either the input or output fibers depending upon the function and fiber 2 is the add or drop fiber. The arrangement of fibers within the ferrule is only intended to convey how optical signals are coupled to and from the fibers via the OADM, the actual physical configuration of the fiber (as shown in FIGS. 6a–6c) may be quite different. For clarity, the same element numbers are used to indicate like elements in all three figures and the arrows show the path of the optical signals for a drop configuration.

As shown in FIGS. 5a through 5c, a three-port optical add/drop multiplexer (OADM) 110 in accordance with the present invention comprises a glass ferrule 112 having an input side 114 and an output side 116, and an opening formed therethrough. First, second and third optical fibers 124, 126 and 128, respectively, are inserted in the opening and extend outwardly from the same input side of the ferrule. Together the ferrule and three fibers form a 3-fiber pigtail 130 with all of the fibers on one side. A collimating lens 132 such as a C-lens or GRIN lens is positioned on output side 116 of ferrule 112.

The axis of collimating lens 132 suitably lies at the center of ferrule 112 with the three fibers preferably equally spaced from the central axis, or optical axis, of lens 132 within opening. If the fibers are not equally spaced from the central axis, they will each have a different angle of incidence (AOI) with respect to the filter. This leads to a center wavelength shift in the transmitted and reflected beams. The negative impact of this is that the add/drop channel path will consist of two offset filters, which will attenuate and corrupt the transmitted signal. Additionally, the signals which are reflected by the filter will be shifted, or offset, in wavelength relative to added or dropped signals.

A standard linear 3-fiber ferrule 112a of the type shown in FIG. 6a, in which the 3 fibers are squeezed into a rectangular opening 119a, will induce a center wavelength shift. A triangular 3-fiber ferrule 112b of the type shown in FIG. 6b, in which the 3 fibers are squeezed into a triangular opening 119b, works in theory but cannot be properly aligned using the standard technique of centering the lens between two fibers. Practical implementation of the triangular 3-fiber ferrule would require a new technique for aligning the lens center to the center of the triangle. Therefore, a square 4-fiber ferrule 112c of the type shown in FIG. 6c, in which 4 fiber are squeezed into a square opening 119c, is currently preferred because accurate alignment can be achieved by centering the lens between the two diagonal fibers 124 and 128. The fourth "dummy" fiber 129 is suitably clipped off outside the ferrule and serves only as a mechanical spacer to facilitate simple and effective alignment of the 3 fibers to the axis of the collimating lens.

Figure 7:
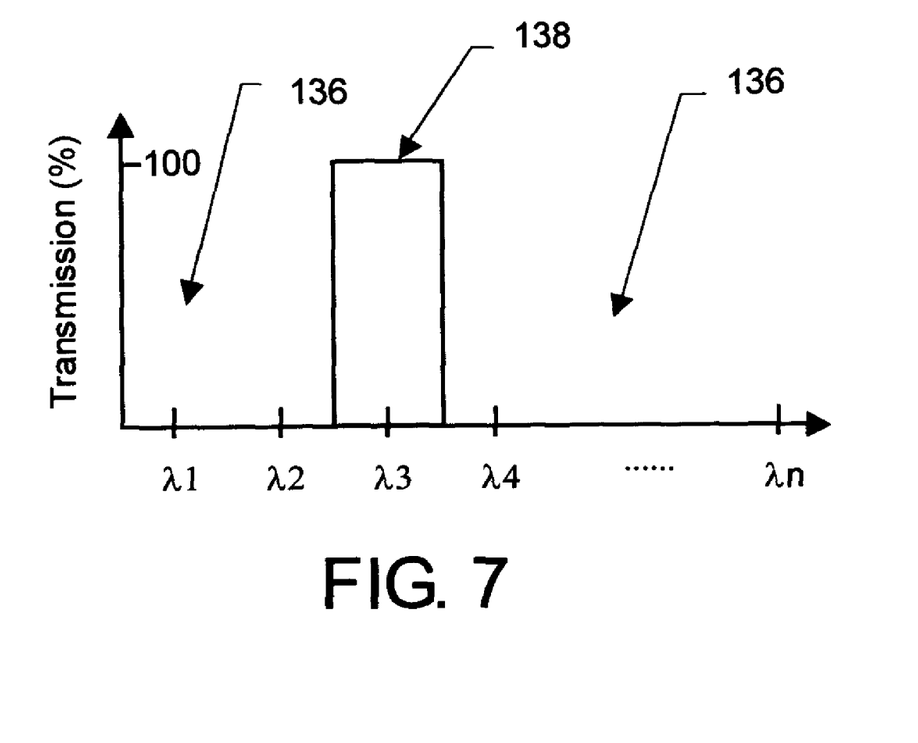
FIG. 7 is a plot of the transmission characteristics of the filter.

A filter 134 such as a thin-film filter available from OCLI, Inc. is placed adjacent to the collimating lens and positioned such that optical signals in the filter's reflection band 136 (see FIG. 7) are reflected back through the collimating lens to and from the first and third fibers and optical signals in the filter's transmission band 138 (see FIG. 7) are transmitted through the filter. Optical signals emanating from the first and third fibers traverse beam paths 140 and 142 through the lens and are reflected off of the filter back into the collimating lens, which focuses the optical signals into the third and first fibers, respectively. In FIG. 5*a*, filter 134 is approximately perpendicular to the axis, whereas in FIGS. 5*b* and 5*c* the filter is suitably angled to minimize insertion loss of the reflected signals into the output fiber. Filter 134 suitably comprises a bandpass filter or one or more cascaded lowpass or highpass filters.

A reflector 144 is positioned behind and at angle to filter 134 such that optical signals transmitted through the filter are reflected back through the filter and collimating lens to and from the first and second fibers via beam paths 140 and 146, respectively. An off the shelf dielectric mirror is sufficient. The reflector may be selected to reflect light across a broad band of wavelengths or across a narrow band around the signal of interest. The geometry of the device including the reflector angle and the spacing of the lens, filter and reflector is optimized to minimize coupling loss of the optical signals into the fibers. The filter's reflective coating can be formed on either its front or back surfaces. However, placement of the coating on the back surface closer to the reflector will reduce insertion loss for both reflect channel and transmit channel by reducing the distance between these two reflective surfaces and the focal point of the lens.

In each of the three illustrated configurations, the same device can be used as an add or a drop multiplexer. The only difference is that the input and output fibers are reversed, the drop port becomes the add port and the arrows indicating the path optical signals are reversed. So in a drop mux, first fiber 124 is the input fiber, second fiber 126 is the drop fiber and third fiber 128 is the output fiber. Conversely in an add mux, first fiber 124 is the output fiber, second fiber 126 is the add fiber and third fiber 128 is the input fiber.

When configured as a drop multiplexer, a multiplexed optical signal comprising multiple optical signals at channel wavelengths $\lambda_1$–$\lambda_N$ is carried into the device on input fiber 124 and exits the fiber at the output side 116 of ferrule 112. The optical signal then enters lens 132 and is collimated by lens 132 along beam path 140. The optical signal exits the lens and is directed to filter 134, which without loss of generality passes channel wavelength $\lambda_3$, i.e. the dropped channel, and reflects the remaining channels back to collimating lens 132, which directs the channels along beam path 142 where they are focused into output fiber 128. The dropped channel is reflected off of the reflector back through filter 134 to collimating lens 132, which directs the dropped channel along beam path 146 where it is focused onto drop fiber 126 at the output side 116 of ferrule 112.

When configured as an add multiplexer, a multiplexed optical signal comprising multiple optical signals at, for example, channel wavelengths $\lambda_1$, $\lambda_2$, $\lambda_4$–$\lambda_N$ is carried into the device on input fiber 128 and exits the fiber at the output side 116 of ferrule 112. The optical signal then enters and is collimated by lens 132 along beam path 142. The optical signal exits the lens and is directed to filter 134, which would pass channel wavelength $\lambda_3$, i.e. the added channel, and reflects the remaining channels back to collimating lens 132, which directs the channels along beam path 140 where they are focused into output fiber 124. The added channel is brought into the device on add fiber 126, collimated and directed along beam path 146 and through the filter 134 and is reflected off of the reflector back through filter 134 to collimating lens 132, which directs the added channel along beam path 140 where it is focused onto output fiber 124 at the output side 116 of ferrule 112 and added to the other channels.

Figure 8A:
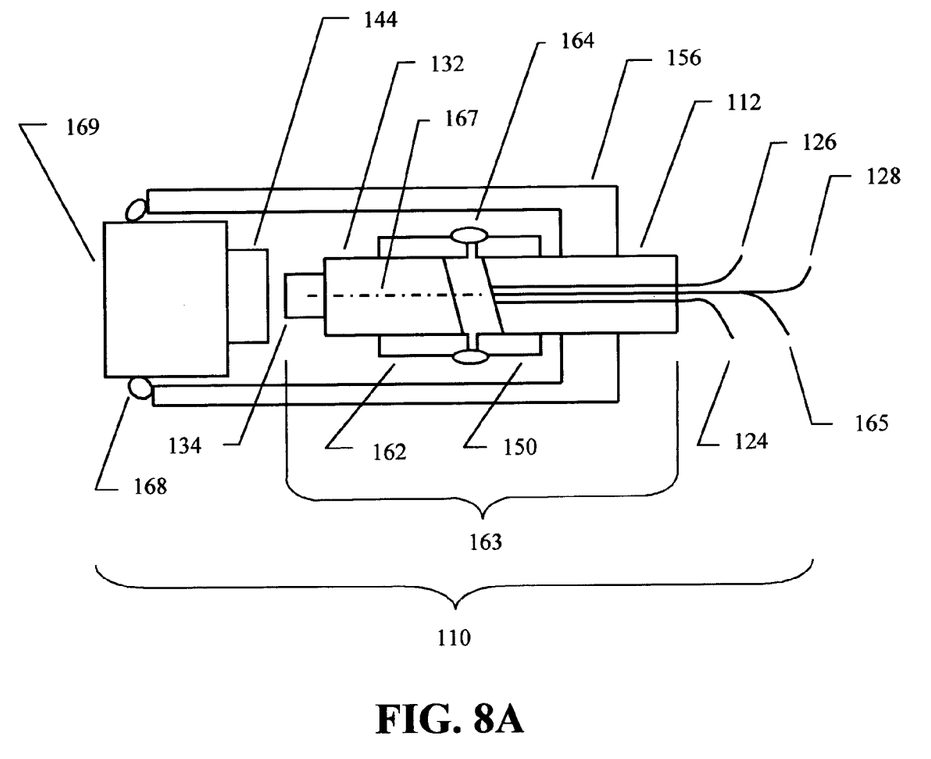
FIGS. 8a and 8b are structural diagrams of an embodiment of the three-port OADM of FIG. 5 using a 4-fiber ferrule.
Figure 8B:
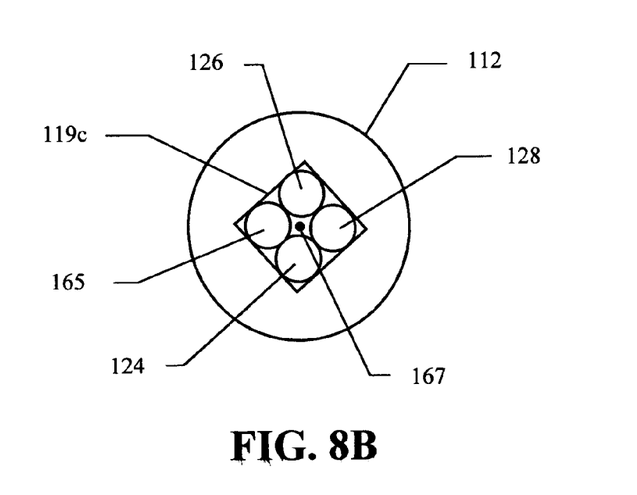

FIGS. 8*a* and 8*b* depict the OADM 110 of FIG. 5*a* as it might appear in an actual package. The OADM may be assembled according to the following steps. Four fibers including fibers 124, 126 and 128 and a "dummy" fiber 165 are inserted or squeezed into a square opening 119*c* in ferrule 112 (as shown in FIG. 8*b*) and bonded with epoxy as shown. Dummy fiber 165 is suitably clipped because its only function is to serve as a mechanical spacer inside the ferrule. The ferrule assembly is inserted into a glass tube 150 and bonded with epoxy. A collimating lens 132 and filter 134 are bonded with epoxy and assembled in a second glass tube 162 as shown. This assembly is aligned and bonded to glass tube 150 to form an aligned filter assembly 163 in which the central axis 167 of lens 132 extends through the ferrule and the first, second and third fibers are substantially equal distant from the central axis.

Angular and radial alignment of the beam between fibers is achieved by relative motion between the glass tubes 150, 162. Epoxy 164 is applied to fix the correct position. Collimation of the beams can be achieved by moving the glass tubes 150, 162 relative to each other, or by sliding the lens 132 in the glass tube 162 after the tubes 150, 162 have been aligned and epoxied in the correct angular and radial positions. Conversely, the ferrule 112 may be allowed to slide in the glass tube 150 to achieve collimation. The facets of fiber pigtail and lens assemblies are preferably formed with angled faces, which reduce back reflection of the optical signals. The size of the air gap between the assemblies is dictated by the back working distance of the lens. The aligned lens assembly 163 is bonded to the housing 156 to protect the assembly and provide a mechanical reference for the reflector 144. The reflector 144 is bonded to a reflector mount 169. This assembly is then aligned to the housing 156 to minimize insertion losses and bonded in place with epoxy 168. In both alignment steps, the signal may be optimized for the correct center wavelength as well as for low insertion loss.

The OADM 110 may be packaged in many different configurations without departing from the schematic shown in FIG. 5. In addition, other means than epoxy may be used to bond the reflector to the filter.

Figure 9:
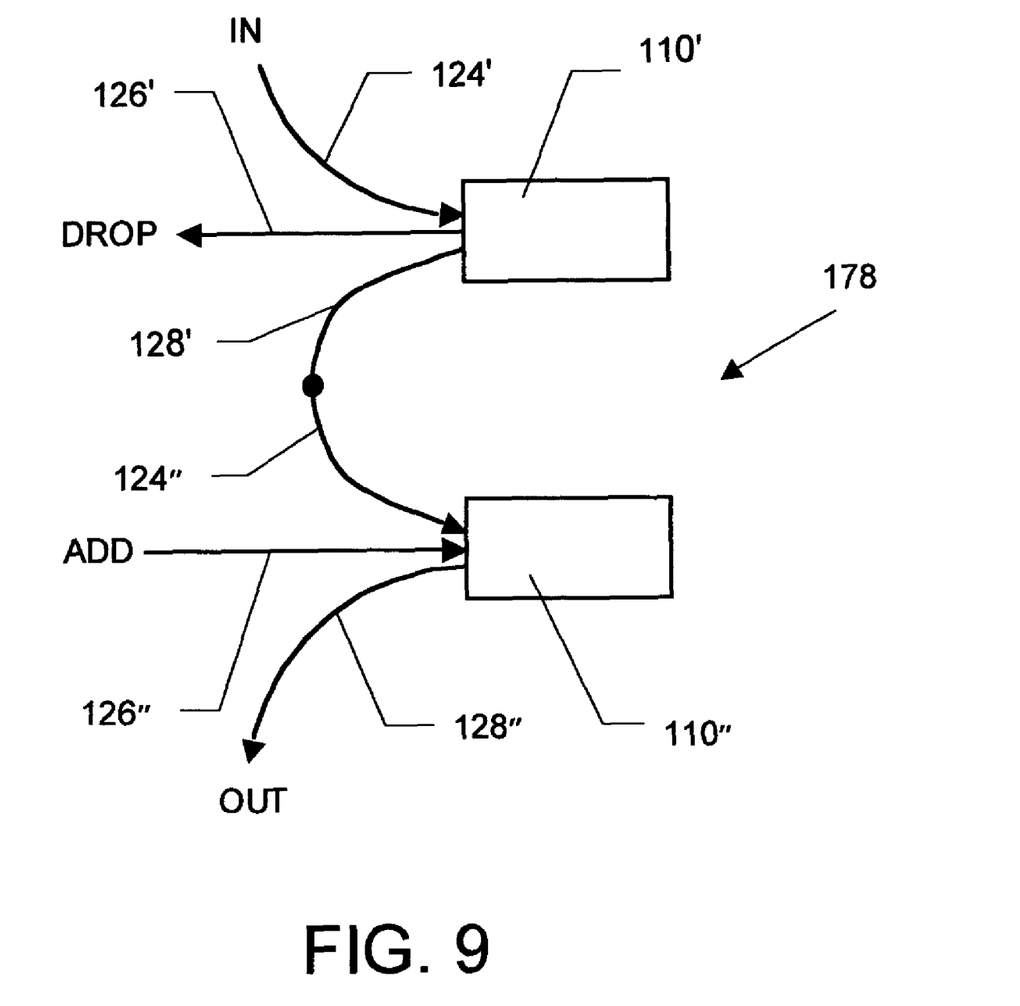

As shown in FIG. 9, the topology of a 4-port OADM 178 formed by fiber splicing a pair of 3-port OADMs 110 of the type shown in FIGS. 5*a*–5*c* together is similar to the known technique shown in FIG. 3. Add OADM 110" is identical to drop OADM 110' except that input and output fibers shown in FIGS. 5*a*–5*c* have been reversed to facilitate the add function. Using the 3-port device shown in FIG. 5*a* as an example, the output fiber 128' of the drop OADM 110' is fiber spliced to the output fiber 124" of the add OADM 110". In operation, a multiplexed optical signal carrier on input fiber 124' enters OADM 110' and the desired channel is dropped on drop fiber 126'. The remaining optical channels are reflect back to output fiber 128', which is fiber spliced to input fiber 124". The multiplexed optical signal, absent the drop channel, enters OADM 110". A add channel at the same channel wavelength as the drop channel is inserted through add fiber 126" into the multiplexed optical signal, which is then transmitted on output fiber 128".

While several illustrative embodiments of the invention have been shown and described, numerous variations and alternate embodiments will occur to those skilled in the art. For example, incorporation of a tunable filter could provide tunable 3-port and 4-port OADMS. Also, the 3-port and 4-port single-channel devices can be combined to form multi-channel OADMs. Such variations and alternate embodiments are contemplated, and can be made without departing from the spirit and scope of the invention as defined in the appended claims.

We claim:

1. A three-port single-channel optical add/drop multiplexer (OADM), comprising:
    a ferrule having an input side and an output side, and an opening formed therethrough;
    first, second and third optical fibers inserted in the opening and extending outwardly from the input side of the ferrule;
    a collimating lens positioned on the output side of the ferrule;
    a filter having a first side and a second side, the first side optically coupled to the collimating lens and being positioned at a non-zero angle relative to a transmission axis of the collimating lens, the filter being operable, over substantially the filter's entire extent, to pass one or more particular wavelengths within a passband of the filter to a reflector and the filter being operable to reflect one or more particular wavelengths within a reflection band of the filter back through the collimating lens to the third optical fiber; and
    the reflector, coupled to the second side of the filter, and at an angle to the filter such that an optical signal transmitted through the filter from the first optical fiber is reflected back through the filter and collimating lens to the second optical fiber.

2. The three-port OADM of claim 1, where the first, second and third fibers are positioned in a linear configuration inside the ferrule.

3. The three-port OADM of claim 2, wherein the first, second and third fibers are formed in a triangular configuration inside the opening.

4. The three-port OADM of claim 2, wherein four fibers are assembled in a ferrule in a square configuration, and 3 of the fibers comprise the first, second and third fibers.

5. The three-port OADM of claim 1, wherein the collimating lens is a C-lens or a GRIN lens.

6. The three-port OADM of claim 1, wherein the filter comprises a thin-film filter.

7. The three-port OADM of claim 6, wherein the filter comprises a coating on a surface of the second side of the filter.

8. The three-port OADM of claim 1, wherein said ferrule and said first, second and third fibers are formed inside a first glass tube to form a 3-fiber pigtail assembly, said collimating lens and said filter being formed in a second glass tube to form a lens assembly, said 3-fiber pigtail assembly and said lens assembly being aligned and bonded together to form an aligned filter assembly, which is bonded to a housing, said reflector being bonded to a reflector mount, which is aligned and bonded to said housing.

9. The three-port OADM of claim 1, wherein the first fiber is an input fiber and the third fiber is an output fiber, and further comprising a second OADM having a first fiber that is an output fiber and a third fiber that is an input fiber, said third fibers being fiber spliced together to form a 4-port OADM.

10. The three-port OADM of claim 1, wherein said filter is positioned approximately perpendicular to the axis of the collimating lens so that optical signals in the filter's reflection band are reflected from the first fiber to the third fiber.

11. The three-port OADM of claim 1, wherein the reflector is positioned at an angle to the axis of the collimating lens so that optical signals in the filter's passband are reflected from the first fiber to the second fiber.

12. A three-port optical drop multiplexer, comprising:
    a 3-fiber pigtail having an input fiber configured to receive a multiplexed optical signal comprising a plurality of optical channels, a drop fiber, and an output fiber;
    a collimating lens that collimates the multiplexed optical signal;
    a filter having a first side optically coupled to the collimating lens and a second side, positioned at a non-zero angle relative to a transmission axis of the collimating lens, the filter, operable over substantially the filter's entire extent, having a transmission band that transmits a drop channel having a particular wavelength and a reflection band that reflects the optical channels having wavelengths other than the drop channel, said filter positioned adjacent to the collimating lens such that optical channels in the filter's reflection band are reflected back through the collimating lens to the output fiber and the drop channel in the filter's transmission band is transmitted through the filter to a reflector; and
    the reflector coupled to the second side of the filter such that the drop channel transmitted through the filter is reflected back through the filter and the collimating lens to the drop fiber.

13. The three-port optical drop multiplexer of claim 12, where the input, drop and output fibers are positioned in a linear configuration within the 3-fiber pigtail.

14. The three-port optical drop multiplexer of claim 13, wherein four fibers are assembled in the pigtail in a square configuration, and three of the fibers comprise the input, drop and output fibers.

15. The three-port optical drop multiplexer of claim 13, wherein the filter comprises a thin-film filter.

16. The three-port optical drop multiplexer of claim 15, wherein the filter comprises a coating on a surface of the second side of the filter.

17. The three-port drop multiplexer of claim 12, wherein said collimating lens and said filter being formed in a second glass tube to form a lens assembly, said 3-fiber pigtail assembly and said lens assembly being aligned and bonded together to form an aligned filter assembly, which is bonded to a housing, said reflector being bounded to a reflector mount, which is aligned and bonded to said housing.

18. The three-port drop multiplexer of claim 12, wherein said filter is positioned approximately perpendicular to the axis of the collimating lens so that optical signals in the filter's reflection band are reflected from the input fiber to the output fiber.

19. The three-port drop multiplexer of claim 12, wherein the reflector is positioned at an angle to the axis of the collimating lens so that optical signals in the filter's passband are reflected from the input fiber to the drop fiber.

20. A three-port optical add multiplexer, comprising:
    a 3-fiber pigtail having an input fiber configured to receive a multiplexed optical signal comprising a plurality of optical channels including an add channel, an add fiber configured to receive an add signal, and an output fiber;

a collimating lens that collimates the multiplexed optical signal and the add signal;

a filter having a first side optically coupled to the collimating lens and a second side, the filter, operable over substantially the filter's entire extent, having a transmission band that transmits the add channel having a particular wavelength and a reflection band that reflects optical channels having wavelengths other than the add channel, said filter positioned adjacent to the collimating lens such that optical channels in the filter's reflection band are reflected back through the collimating lens to the output fiber and the add channel in the filter's transmission band is transmitted through the filter to a reflector; and the reflector, coupled to the second side of the filter, and at an angle to the filter sub that the add channel transmitted through the filter is reflected back through the filter and the collimating lens where it is combined with the multiplexed optical signal at the output fiber.

21. The three-port optical add multiplexer of claim 20, wherein the collimating lens has a central axis, said input, add and output fibers spaced substantially equal distance from the central axis.

22. The three-port optical add multiplexer of claim 20, wherein four fibers are assembled in the pigtail in a square configuration, and three of the fibers comprise the input drop and output fibers.

23. The three-port optical add multiplexer of claim 20, wherein the filter comprises a thin-film filter having a reflective coating on a surface of the collimating lens.

24. The three-port optical add multiplexer of claim 20, wherein said collimating lens and said filter being formed in a glass tube to form a lens assembly, said 3-fiber pigtail assembly and said lens assembly being aligned and bonded together to form an aligned filter assembly, which is bonded to a housing, said reflector being bonded to a reflector mount, which is aligned and bonded to said filter.

25. The three-port optical add multiplexer of claim 20, wherein said filter is positioned approximately perpendicular to the axis of the collimating lens so that optical signals in the filter's reflection band are reflected from the input fiber to the output fiber.

26. The three-port optical add multiplexer of claim 20, wherein said filter is positioned at an angle to the axis of the collimating lens so that optical signals in the filter's reflection band are reflected from the input fiber to the output fiber.

27. The three-port optical add multiplexer of claim 20, wherein the reflector is positioned at an angle to the axis of the collimating lens so that optical signals in the filter's passband are reflected from the add fiber to the output fiber.

28. A three-port single-channel optical add/drop multiplexer (OADM), comprising:

a ferrule having an input side and an output side, and an opening formed therethrough first, second, third and fourth optical fibers inserted in said opening in a substantially square configuration, at least said first, second and third fibers extending outwardly from the same input side of the ferrule;

a collimating lens positioned on the output side of the ferrule, said collimating lens having a central axis that extends through said ferrule such that said first, second and third fibers are substantially equal distant from the central axis;

a filter having a first side and a second side, the first side optically coupled to the collimating lens and being positioned at a non-zero angle relative to a transmission axis of the collimating lens, the filter being operable, over substantially the filter's entire extent, to pass one or more particular wavelengths within a passband of the filter to a reflector and the filter being operable to reflect one or more particular wavelengths within a reflection band of the filter back through the collimating lens to the third fiber, and the reflector coupled to the second side of the filter and at an angle to the filter such an optical signal transmitted through the filter from the first optical fiber is reflected back through the filter and collimating lens to the second optical fiber.

29. The three-port optical add/drop multiplexer of claim 28, wherein said ferrule and said first, second, third and fourth fibers are formed inside a first glass tube to form a 4-fiber pigtail assembly, said collimating lens and said filter being formed in a second glass tube to form a lens assembly, said 4-fiber pigtail assembly and said lens assembly being aligned and bonded together to form an aligned filter assembly, which is bonded to a housing, said reflector being bonded to a reflector mount, which is aligned and bonded to said housing.

\* \* \* \* \*